(12) United States Patent
Lawrence

(10) Patent No.: US 10,951,914 B2
(45) Date of Patent: Mar. 16, 2021

(54) RELIABLE LARGE GROUP OF PICTURES (GOP) FILE STREAMING TO WIRELESS DISPLAYS

(71) Applicant: Intel Corporation, Santa Clara, CA (US)

(72) Inventor: Sean J. Lawrence, Bangalore (IN)

(73) Assignee: Intel Corporation, Santa Clara, CA (US)

(*) Notice: Subject to any disclaimer, the term of this patent is extended or adjusted under 35 U.S.C. 154(b) by 976 days.

(21) Appl. No.: 14/837,320

(22) Filed: Aug. 27, 2015

(65) Prior Publication Data
US 2017/0064329 A1  Mar. 2, 2017

(51) Int. Cl.
| H04N 19/58 | (2014.01) |
| H04N 19/172 | (2014.01) |
| H04N 19/52 | (2014.01) |
| H04N 19/593 | (2014.01) |
| H04N 19/40 | (2014.01) |

(Continued)

(52) U.S. Cl.
CPC .......... *H04N 19/58* (2014.11); *H04L 65/602* (2013.01); *H04L 65/607* (2013.01); *H04N 19/107* (2014.11); *H04N 19/114* (2014.11); *H04N 19/139* (2014.11); *H04N 19/172* (2014.11); *H04N 19/177* (2014.11); *H04N 19/40* (2014.11); *H04N 19/52* (2014.11); *H04N 19/593* (2014.11); *H04N 19/65* (2014.11); *H04N 19/895* (2014.11);

(Continued)

(58) Field of Classification Search
CPC ...................................................... H04N 19/58

USPC ...................................................... 375/240.16
See application file for complete search history.

(56) References Cited

U.S. PATENT DOCUMENTS

| 9,094,641 | B1* | 7/2015 | Ansley | ............ | H04N 21/23424 |
| 2010/0124274 | A1* | 5/2010 | Cheok | .................. | H04N 19/176 |
| | | | | | 375/240.03 |

(Continued)

OTHER PUBLICATIONS

Wifi Alliance, Wi-Fi Alliance Technical Committee, Wi-Fi Display Technical Task Group, Wi-Fi Display Technical Specification Version 1.0.0, 2012; 149 pages.

(Continued)

*Primary Examiner* — Christopher S Kelley
*Assistant Examiner* — Asmamaw G Tarko
(74) *Attorney, Agent, or Firm* — Green, Howard & Mughal LLP.

(57) ABSTRACT

One or more system, apparatus, method, and computer readable media is described for reducing the GOP length during a direct pass-through of an encoded video stream format that is supported by the decoder at the sink. In some embodiments, the encoded video stream is decoded on the source device and employed to generate and insert supplemental intra-predicted frames (I-frames) at shorter intervals allowing for faster recovery in the event of lost packets/ frames when transmitted to a sink display. In some embodiments, Residual Artifact Suppressed (RAS) inter-predicted frames are further created and inserted in place of any frames that reference a frame converted to a supplemental I-frame. The encoded video stream passed through will consist of all the original frames except for the supplemental I-frames reducing the GOP, and RAS inter-predicted frames modified to prevent propagation of residual induced artifacts.

20 Claims, 12 Drawing Sheets

(51) Int. Cl.

| | | |
|---|---|---|
| *H04N 19/177* | (2014.01) | |
| *H04N 19/139* | (2014.01) | |
| *H04N 21/4363* | (2011.01) | |
| *H04N 21/4402* | (2011.01) | |
| *H04L 29/06* | (2006.01) | |
| *H04N 19/895* | (2014.01) | |
| *H04N 19/107* | (2014.01) | |
| *H04N 19/65* | (2014.01) | |
| *H04N 19/114* | (2014.01) | |
| *H04N 21/41* | (2011.01) | |

(52) U.S. Cl.
CPC ... *H04N 21/43637* (2013.01); *H04N 21/4402* (2013.01); *H04N 21/440245* (2013.01); *H04N 21/4122* (2013.01)

(56) References Cited

U.S. PATENT DOCUMENTS

| | | | | | |
|---|---|---|---|---|---|
| 2010/0322310 | A1* | 12/2010 | Deng | ............... | H04N 5/147 375/240.12 |
| 2010/0329338 | A1* | 12/2010 | Coban | ............... | H04N 19/70 375/240.15 |
| 2011/0069757 | A1* | 3/2011 | Ammu | ............... | H04N 19/006 375/240.12 |
| 2012/0170903 | A1* | 7/2012 | Shirron | ............... | H04N 5/783 386/230 |
| 2012/0195227 | A1* | 8/2012 | Vedantham | ....... | H04W 52/0232 370/253 |
| 2013/0114744 | A1* | 5/2013 | Mutton | ............... | H04N 19/40 375/240.26 |
| 2013/0156098 | A1* | 6/2013 | Schwartz | ............ | H04N 19/172 375/240.03 |
| 2014/0289627 | A1* | 9/2014 | Brockmann | ..... | H04N 21/23412 715/719 |
| 2015/0036735 | A1* | 2/2015 | Smadi | ............. | H04N 21/43615 375/240.02 |
| 2016/0352754 | A1* | 12/2016 | Kim | ............... | H04L 63/20 |

OTHER PUBLICATIONS

Wifi Alliance, Wi-Fi Display Technical Specification Version 1.0. 02; Wi-Fi Display Tech TG internal version; Wi-Fi Alliance Technical Committee, Wi-Fi Display Technical Task Group, 2012, 151 pages.

Barile, Steve, "Intel Widi Technology: Technical Overview Enabling Dual Screen Apps", 2014, 66 pages.

Bhowmik, Achintya K. et al., "System-Level Display Power Reduction Technologies for Portable Computing and Communications Devices", IEEE Conference on Portable Information Devices, May 25-29, 2007, 5 pages.

\* cited by examiner

RELIABLE LARGE GROUP OF PICTURES (GOP) FILE STREAMING TO WIRELESS DISPLAYS

BACKGROUND

With the increase in mobile devices and the prevalence of wireless networking, wireless display capability is experiencing rapid growth. In wireless display technology, a wireless link between a source device and sink display device replaces the typical data cable between computer and monitor. Wireless display protocols are often peer-to-peer or "direct" and most usage models have a mobile device transmitting media content to be received and displayed by one or more external displays or monitors. In a typical screencasting application for example, a smartphone is wirelessly coupled to one or more external monitors, display panels, televisions, projectors, etc.

Image frames may be encoded where a wireless or wired data channel has insufficient bandwidth to timely send the frame data in an uncompressed format. Depending on the available channel bit rate, a given frame may be compressed to provide a higher or lower quality representation. Wireless display specifications (e.g., WiDi v3.5 by Intel Corporation, and Wi-Fi Display v1.0 or WFD from the Miracast program of the Wi-Fi Alliance) have been developed for the transmission of compressed graphics/video data and audio data streams over wireless local area networks of sufficient bandwidth. For example, current wireless display technologies utilizing WiFi technology (e.g., 2.4 GHz and 5 GHz radio bands) are capable of streaming encoded full HD video data as well as high fidelity audio data (e.g., 5.1 surround).

Wi-Fi Display v2.0 includes a mode that allows streaming of content in the form of stored files on the Miracast source to the Miracast sink. This is called Miracast direct streaming mode or content pass through, which proposes streaming of stored content in its already encoded format, or transcoding the content into a format that is supported by the Miracast link and sink. Often, the video content stored on the sink is in a format that has very long GOP (Group of Pictures) for optimal compression. FIG. 1A illustrates an exemplary encoded video stream 107. Video stream 107 includes a long GOP 108 comprising many inter-predicted frame (P-frames) 108 between intra-predicted frames (I-frame) 1, 30. Very long GOP sizes are not friendly to wireless streaming as lost packets and frames will result in an incorrectly decoded video stream at the sink, as further shown in FIG. 1B, 1C. During transmission of encoded stream 104 between source and sink, data packets corresponding to pictures 141 are lost from sink received encoded stream 140. Sink decoding then generates an decompressed stream 168, repeating one or more frame 142 to maintain synchronization in response to missing pictures 141. Because of the frames lost in transmission, subsequent frames in the GOP 108 may be decoded incorrectly. Depending on the position of the lost frame(s) and the length of GOP 108, incorrectly decoded video frame set 109 may be significant and result in a slow recovery. Visual artifacts may then be apparent to a viewer as the content stream is rendered and presented on a display at the sink.

One conventional approach to enable direct streaming of content encoded with long GOP streams is to transcode the stream into a format with small GOP before transmission so that any lost frames are recovered quickly. FIG. 1A for example, illustrates a direct streaming system 101 including a source device 105 and a sink device 150. Transcoding generally entails decoding an encoded content file 107 and re-encoding the decoded data into a second encoded bitstream for transmission to sink 105. However, a transcoding pipeline includes at least a demultiplexer 110 to separate audio and video data streams, video transcoder 116, and/or audio transcoder 117 to decode all the pictures in the long GOP stream and re-encode all the decoded frames into a short GOP small GOP stream, and a multiplexer 122 to recombine the audio and video data streams. The transcoded AV stream is then output to a wireless transceiver 128 and compressed frame payloads 140 are wirelessly transmitted to sink device 150.

Transcoding content is resource expensive and consumes significant power at the source device. Although transcoding might be needed when a source is requested to pass through stream formats that are not supported by the sink, it would be advantageous to minimize transcoding where the stream format is supported by the sink while still providing GOP sizes of desirable length.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. Further, where considered appropriate, reference labels have been repeated among the figures to indicate corresponding or analogous elements. In the figures.

DETAILED DESCRIPTION OF EXEMPLARY EMBODIMENTS

Figure 1A:
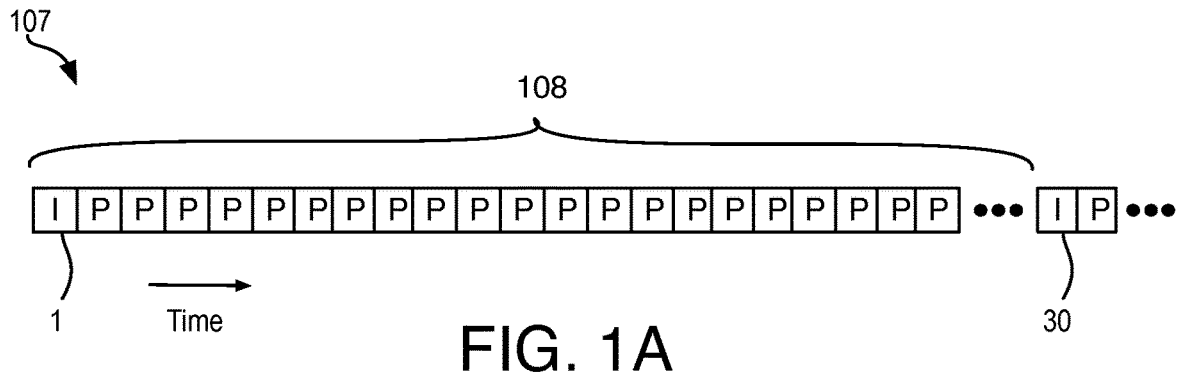
FIG. 1A depicts a conventional encoded video stream with I-frames and P-frames.
Figure 1B:
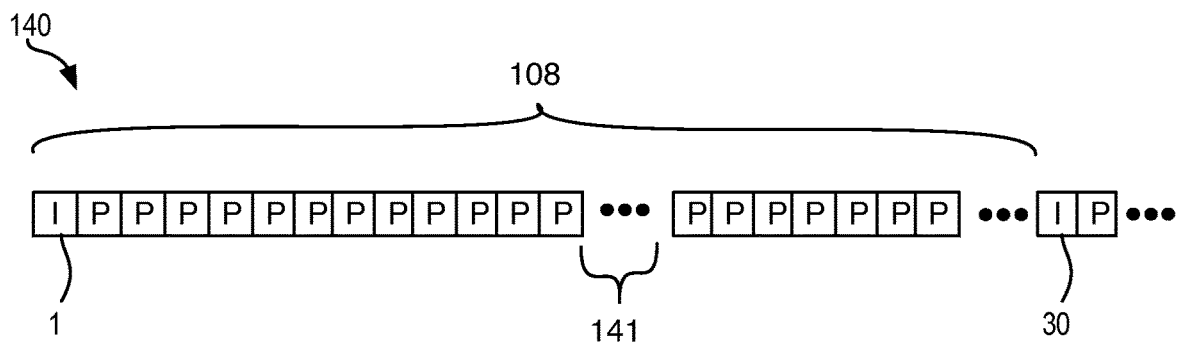
FIG. 1B depicts the conventional encoded video stream illustrated in FIG. 1A after transmission.
Figure 1C:
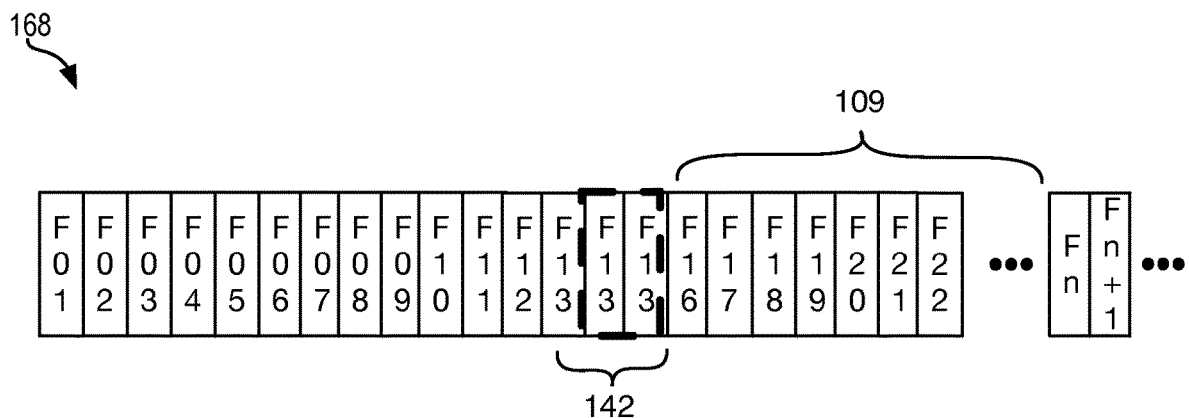
FIG. 1C depicts a conventional video stream decoded from the conventional encoded video stream illustrated in FIG. 1B.
Figure 1D:
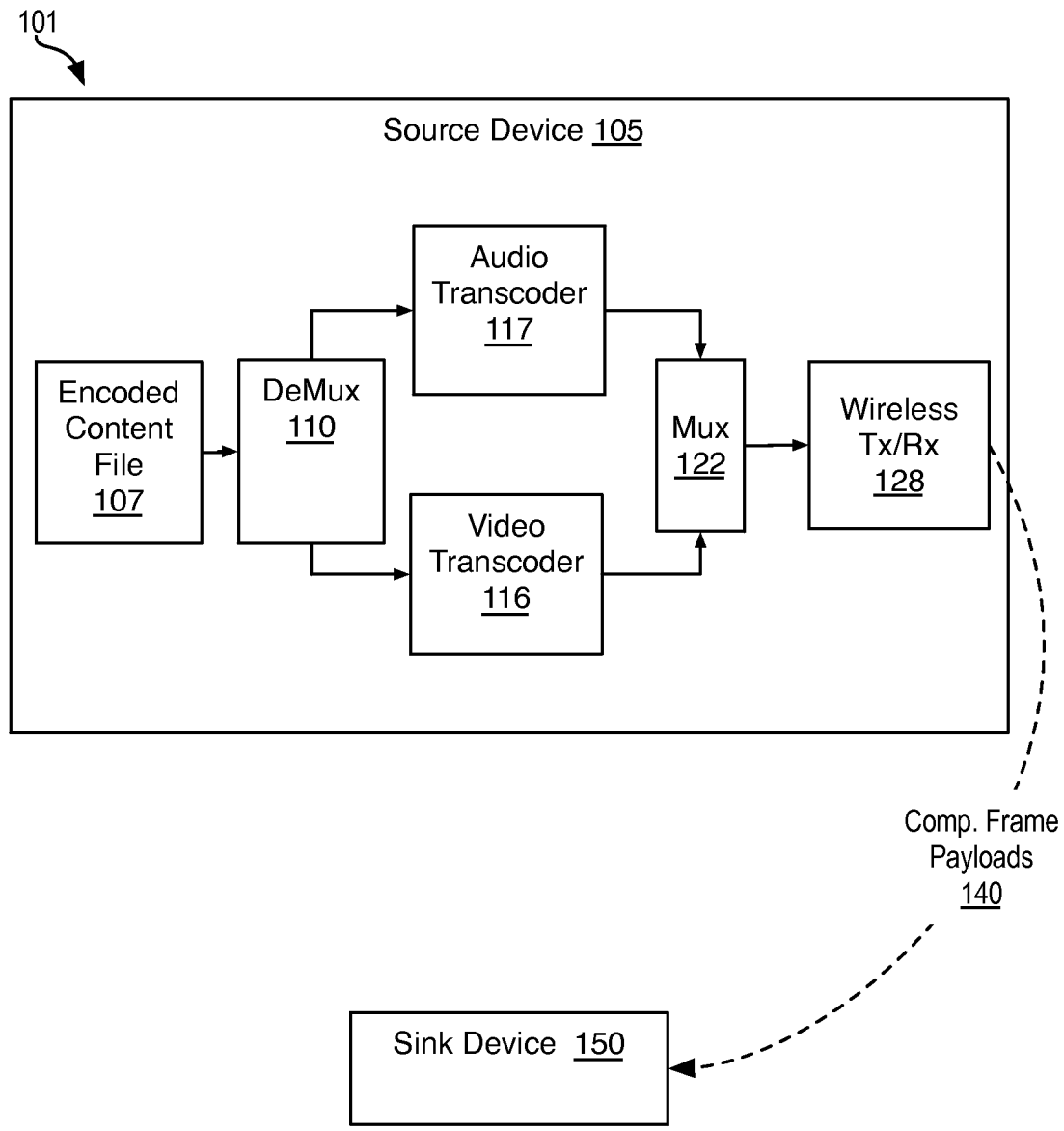
FIG. 1D is a schematic depicting a conventional direct pass-through mode wireless display system.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example as logic circuitry in an image or video processor. Certain other portions may be implemented in hardware, firmware, software, or any combination thereof. At least some of the material disclosed herein may also be implemented as instructions stored on a machine-readable medium, which may be read and executed by one or more processors (graphics/video processor and/or central processor). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more exemplary system, apparatus, method, and computer readable media is described herein for reducing the GOP length during a direct pass-through of an encoded video stream employing long GOP in a format that is supported by the decoder at the sink. The source device is to modify the encoded video stream by selectively transcoding only a portion or a subset of the inter-predicted frames in the GOP. A first subset of the inter-predicted frames are transcoded into supplemental intra-predicted frames. This limited form of "frame-selective" transcoding may reduce the length of a GOP in the video stream, advantageously reducing recovery time at the sink in the event of dropped frames during transmission between the source and sink devices. Selective transcoding in accordance with embodiments described herein may be more efficient at the source and provide better quality at the sink than conventional comprehensive (i.e., non-selective) transcoding algorithms because many frames are retained in their original encoded form.

In some embodiments, the encoded video stream is decoded on the source device. The decoded video frames are employed at the source to create and insert supplemental intra-predicted frames (I-frames) at shorter intervals allowing for faster recovery in the event of lost packets/frames of the original video stream when transmitted to a sink display. The selective encoding therefore entails conversion (i.e., replacement) of a first subset of inter-predicted frames (e.g., P-frames or B-frames) with intra-predicted frames. In some embodiments, Residual Artifact Suppressed (RAS) inter-predicted frames are further created and inserted in place of any inter-predicted frames that reference a frame that is converted to a supplemental I-frame. As such, the encoded video stream passed through will consist of all the original frames except for the supplemental I-frames reducing the GOP, and RAS inter-predicted frames modified to prevent propagation of residual induced artifacts along the GOP that might be otherwise induced by the selective transcoding.

Figure 2A:
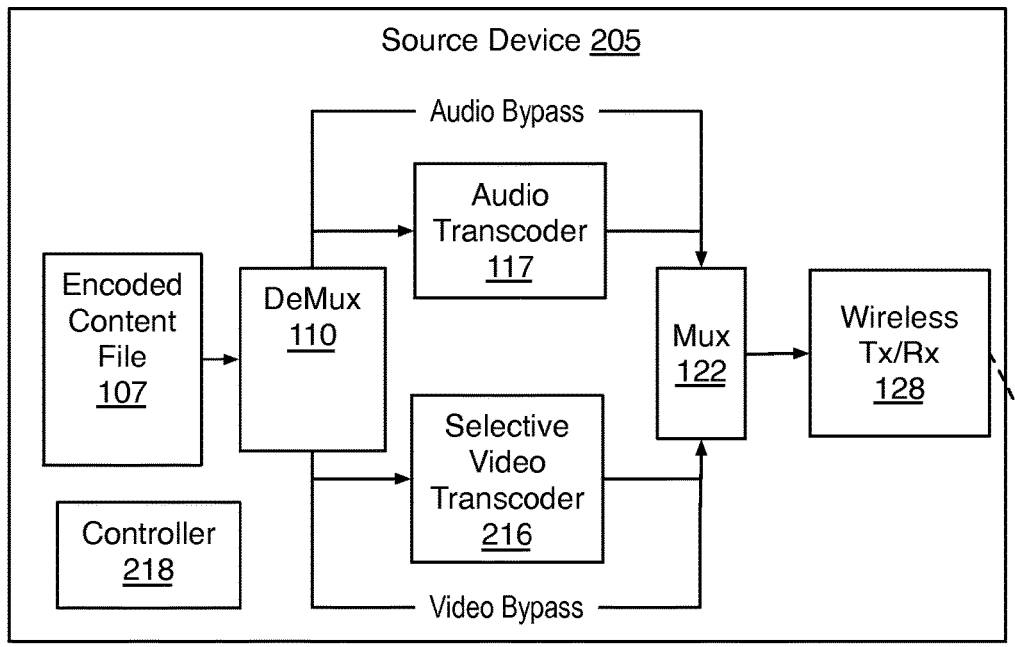
FIG. 2A is a schematic depicting a direct pass-through mode wireless display system, in accordance with some embodiments.
Figure 2A:
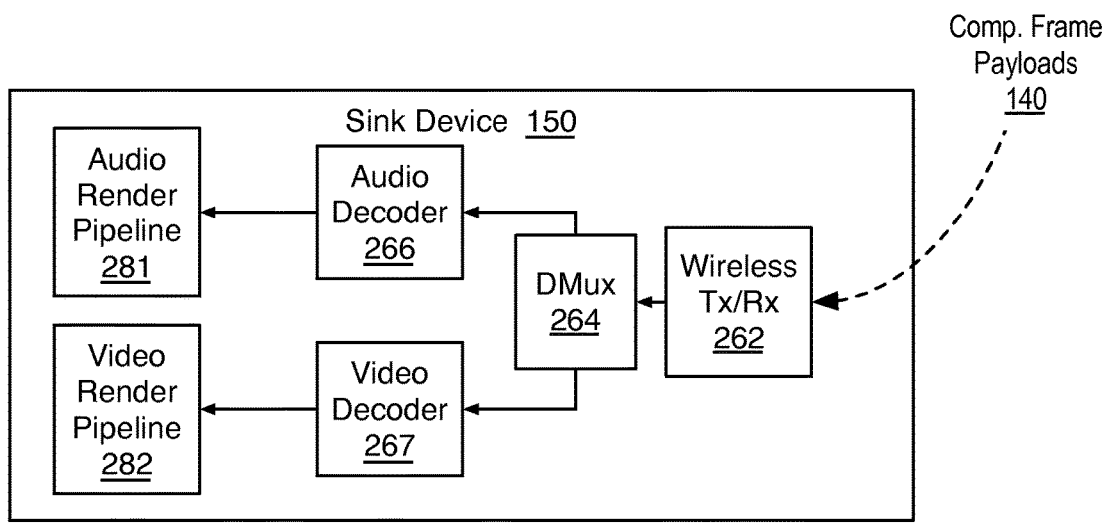

FIG. 2A is a schematic depicting a networked display system 201 operative in a direct-pass through mode, in accordance with some embodiments. System 201 includes source device 205 and sink device 150. In some embodiments, system 201 conforms with one or more wireless display specifications (e.g., WiDi v3.5, Wi-Fi Display v1.0, etc.). Source device 205 and sink device 150 are directly coupled, or "paired," through a wireless link illustrated in dashed line. In some embodiments, source device 205 and sink device 150 are linked over a wireless local area network compliant with WiFi wireless transmission protocol (e.g., 2.4 GHz and 5 GHz radio bands). A similar architecture may be employed for alternative systems that send compressed video frame data between a source and sink display over any other physical layer device (e.g., a wired network).

Source device 205 may be any device including one or more processor operable to decode, encode, and transmit data. Source device 205 includes an encoded content file 107, retained in an electronic memory (e.g., random access or read-only memory) or electronic storage device (e.g., hard drive, optical drive, etc.) coupled (e.g., through a local bus) to an input of a demultiplexer 110. In some embodiments demultiplexer 110 decodes an MPEG program stream (MPS), or MPEG transport stream (MTS) into packetized elementary streams. Audio stream outputs of demultiplexer 110 are further coupled to audio transcoder 117 and multiplexer 122. Audio transcoder 117 is operative to provide any known audio transcoding pipeline and/or perform any known audio transcoding, as embodiments are not limited in this respect. Video stream outputs of demultiplexer 110 are coupled to frame-selective video transcoder 216 and multiplexer 122.

Multiplexer 122 is operative to recombine the video and audio streams, either of which may be at least partially transcoded or in their original encoded format if the transcoder is bypassed. In some embodiments, multiplexer 122 is to code the packetized elementary streams into an MPEG program stream (MPS), or more advantageously, into an MPEG transport stream (MTS). In further embodiments, the MTS is encapsulated following one or more of Real-Time Protocol (RTP), user datagram Protocol (UDP) and Internet Protocol (IP) as embodiments are not limited in this respect. In some RTP embodiments for example, a Network Abstraction Layer (NAL) encoder (not depicted) receives the MTS and generates Network Abstraction Layer Units (NAL units) that are suitable for wireless transmission.

An output of multiplexer 122 is coupled to a wireless transmitter (Tx) or transceiver (Tx/Rx) 128 coupled to receive the coded stream data and output a wireless signal representative of the coded stream data to a sink device. Wireless transceiver 128 may utilize any band known to be suitable for directly conveying (e.g., peer-to-peer) the compressed data playloads 140 for real time presentation on a sink device. In some exemplary embodiments, wireless transceiver 105 is operable in the 2.4 GHz and/or 5 GHz band (e.g., Wi-Fi 802.11n). In some other exemplary embodiments, wireless transceiver is operable in the 60 GHz band.

Sink device 150 includes a wireless transceiver 262 wirelessly coupled to wireless transceiver 128. Wireless transceiver 262 may utilize any frequency band and wireless communication protocol compatible with that of transceiver 128. An output from wireless transceiver 262 is coupled to an input of de-multiplexer 264, which is to process the encapsulated packetized streams into compressed data streams. An AV stream output from the sink transceiver stack is separated into audio and video streams at demultiplexer 264, which has outputs coupled to audio decoder 266 and video decoder 267. Decoder 267 may utilize any codec to generate representations of frame data that are passed to a sink display pipeline. In the illustrated embodiment, the sink display pipeline includes frame buffer 182 and display panel 184, which may be an embedded display of sink device 150. The audio stream is decompressed by audio decoder 266, and passed through audio rendering pipeline 281 in sync with the video stream decompressed by video decoder 267, and passed through video rendering pipeline 282.

In exemplary embodiments, encoded content file 107 is stored on source device 205. In some embodiments, encoded content file 107 comprises compressed graphics frame data representations, such as, but not limited to, AV content. Encoded content file 107 is compliant with a codec supported by both source device 205 and sink device 150. In some embodiments, encoded content file 107 complies with one or more specification maintained by the Motion Picture Experts Group (MPEG), such as, but not limited to MPEG-1 (1993), MPEG-2 (1995), MPEG-4 (1998), and associated International Organization for Standardization/International Electrotechnical Commission (ISO/IEC) specifications. In some exemplary embodiments, encoded content file 107 complies with one or more of H.264/MPEG-4 AVC standard, HEVC standard, VP8 standard, VP9 standard specifications.

At source device 205, either or both of audio and video stream transcoding may be bypassed, or not. Controller 218 is to determine at least whether a compressed video data stream is to be fully transcoded, selectively transcoded, or simply passed-through to multiplexer 122. In some embodiments, in response to content file 107 having video encoded in a format unsupported by sink device 105, controller 218 places frame-selective video transcoder 216 into a comprehensive (non-selective) mode, and the video stream is processed through any known transcoding pipeline and/or algorithm to modify every encoded frame from the original encoding format to another encoding format supported by sink 105.

In response to content file 107 having video encoded in a format supported by sink device 105, the video stream may either bypass frame-selective video transcoder 216, or be partially transcoded as a function of the length of a GOP in the encoded video stream. Controller 218 may determine the GOP length in any manner. For example, controller 218 may ascertain the GOP length through metadata associated with the encoded file 107, or through initial operation of frame-selective video transcoder 216. In response to the GOP length being below minimum threshold, which may be predetermined or adaptive (e.g., responsive to QoS metric associated with the wireless link between source and sink), the encoded video stream is passed-through to multiplexer 122, bypassing frame-selective video transcoder 216. In response to the GOP length exceeding the threshold, selective video encoder 216 is placed into a frame-selective encoding mode operative to reduce the GOP length by transcoding only a subset of the originally encoded frames received from demultiplexer 110.

In some embodiments, frame-selective video transcoder 216 is bypassed until controller 218 detects a drop in QoS at the sink. In some embodiments where frame-selective video transcoder 216 is already enabled, a control parameter of frame-selective video transcoder 216 indicative of a target GOP length is updated in response to detecting a drop in QoS at the sink. With greater reductions in the GOP length, the subset of inter-predicted frames selected for transcoding is to become larger, adaptively shortening recovery time as a function of the QoS.

Figure 2B:
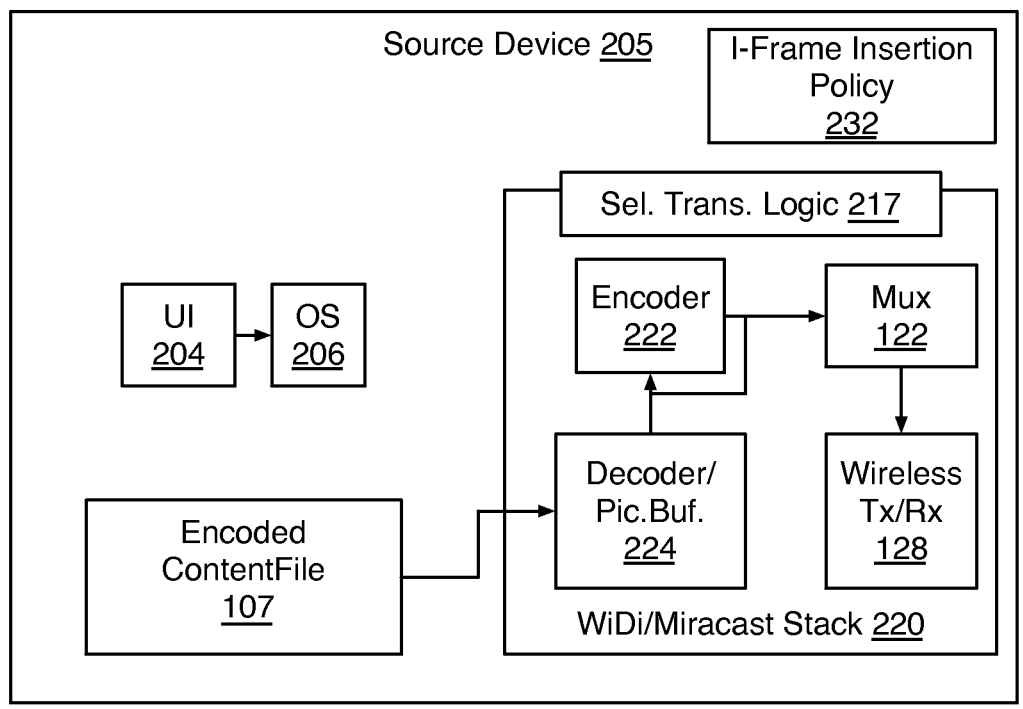
FIG. 2B is a schematic illustrating a direct pass-through mode source device, in accordance with some embodiments.

FIG. 2B is a schematic further illustrating direct pass-through mode source device 205, in accordance with some embodiments. In the illustrative embodiment, source device 205 includes one or more processor to execute an operating system (OS) 206 operable to implement a user interface (UI) 204 through which user input may be received. OS 206 is communicatively coupled to graphics stack 208.

Encoded content file 107 is streamed into decoder 224, for example as controlled through OS 206. An output of decoder 224 is coupled to an input of encoder 222. In the exemplary embodiment decoder 224, and encoder 222 are components of a frame-selective video transcoder implemented as part of a transmission protocol stack 220. Stack 220 is operable to implement and/or comply with one or more wireless High Definition Media Interface (HDMI) protocol, such as, but not limited to, Wireless Home Digital Interface (WHDI), Wireless Display (WiDi), Wi-Fi Direct, Miracast, WirelessHD, or Wireless Gigabit Alliance (WiGig) certification programs. Encoder 122 may implement any codec known performing one or more of transformation, quantization, motion compensated prediction, loop filtering, etc.

Encoder 222 may implement any codec known performing one or more of transformation, quantization, motion compensated prediction, loop filtering, etc. Encoder 222 may further include a local decode loop including a decoder (not depicted) to reconstruct and store reference frame representations. Decoder 224 may likewise implement any codec known performing an inverse of one or more of transformation, quantization, motion compensated prediction, etc. In some embodiments, encoder 222 and decoder 224 comply with one or more specification maintained by the Motion Picture Experts Group (MPEG), such as, but not limited to MPEG-1 (1993), MPEG-2 (1995), MPEG-4 (1998), and associated International Organization for Standardization/International Electrotechnical Commission (ISO/IEC) specifications. In some exemplary embodiments, encoder 222 and decoder 224 comply with one or more of H.264/MPEG-4 AVC standard, HEVC standard, VP8 standard, VP9 standard specifications.

In some embodiments, encoder 222 and decoder 224 are controlled by frame-selective transcoding logic 217 to output a compressed graphics frame data stream as a representation of compressed frames streamed from encoded content file 107. In the exemplary embodiment, differences between the encoding of compressed input and output streams are a function of an inter-predicted (I-frame) insertion policy 232. In some embodiments, I-frame insertion policy 232 specifies a GOP length for the compressed output stream, and/or how many inter-predicted frames (e.g., P-frames or B-frames) within a given GOP in the compressed input stream are to be replaced with I-frames in the output compressed stream. I-frame insertion policy 232 may be in effect while source device 205 is operative in a frame-selective transcoding mode.

In some embodiments, selective transcoding logic 217, encoder 222, and decoder 224 are implemented as fixed or semi-fixed function transcoder circuitry. In other embodiments, one or more of selective transcoding logic 217, encoder 222, and decoder 224 are implemented by fully programmable circuitry executing algorithms specified in instructions stored in a computer-readable medium.

Figure 3:
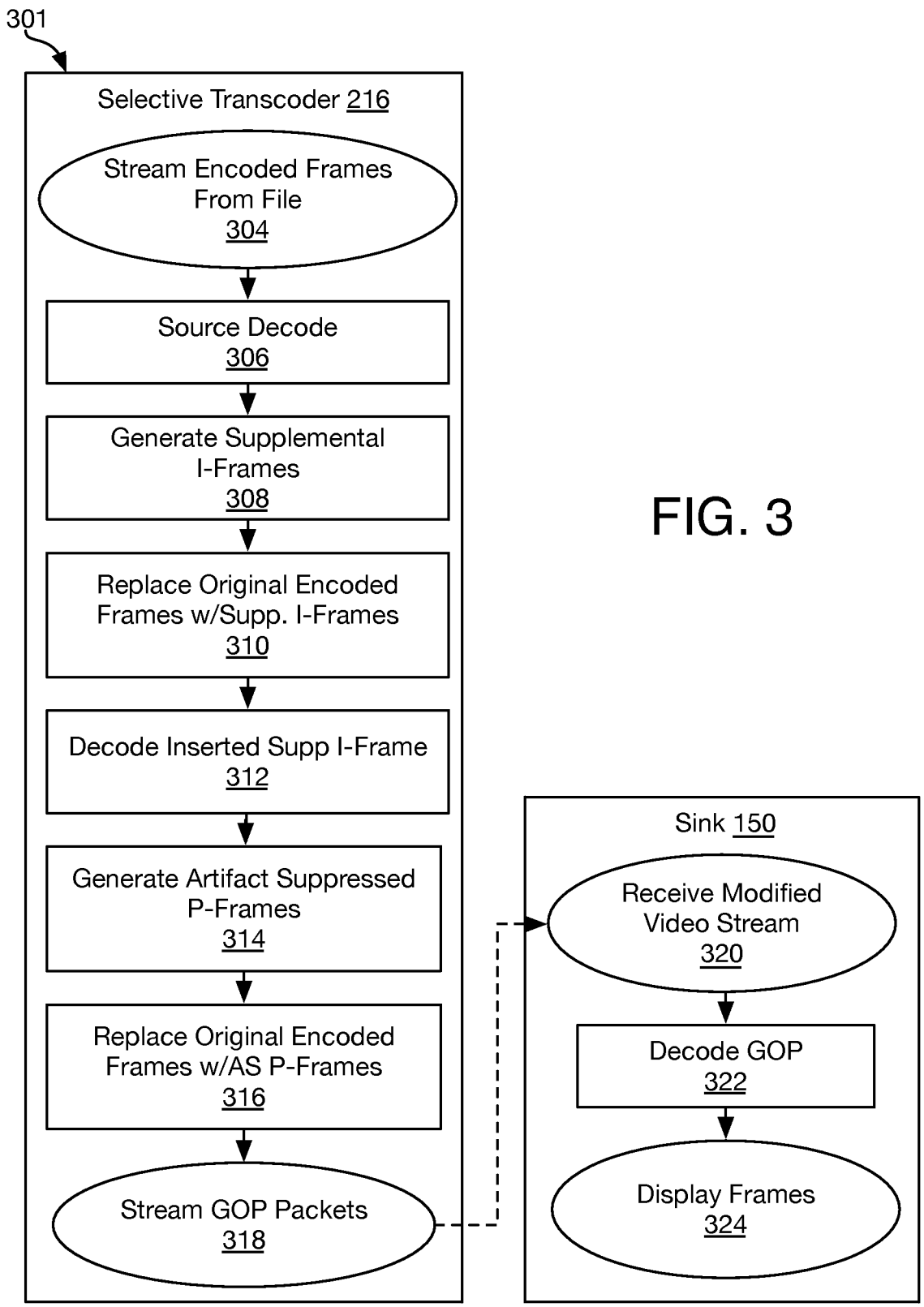
FIG. 3 is a flow diagram depicting a method for selective frame transcoding, in accordance with some embodiments.
Figure 4:
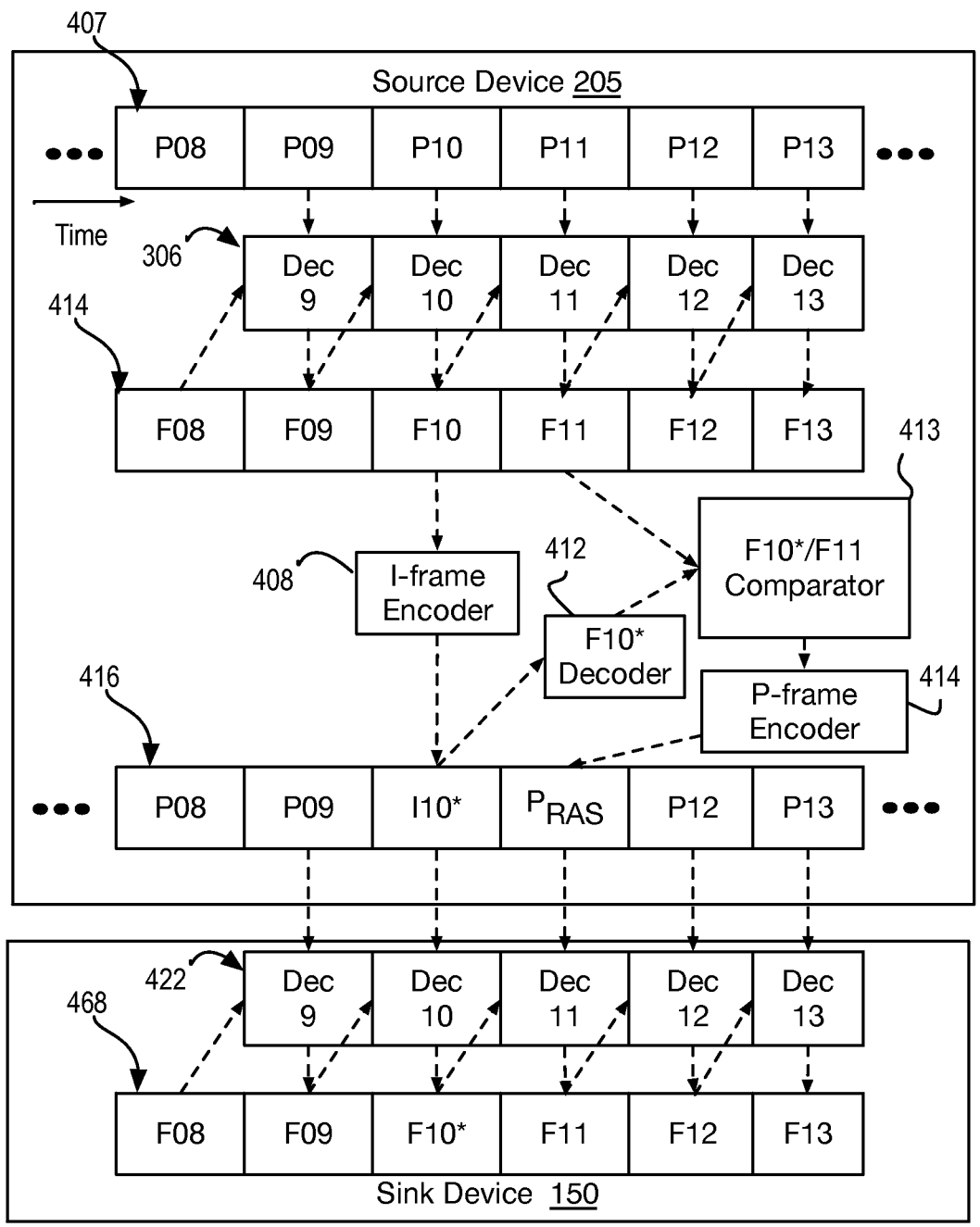
FIG. 4 is a data flow diagram illustrating application of the selective frame transcoding method illustrated in FIG. 3, in accordance with some embodiments.

FIG. 3 is a flow diagram depicting a method 301 for frame-selective transcoding, in accordance with some embodiments. In the illustrative embodiment, method 301 is performed by wireless display system 201 (FIG. 2A) with operations 304-318 performed by selective transcoder 216 and operations 320-324 performed by sink device 150. In other embodiments however, method 301 is implemented by a source device and/or sink device having alternative architectures. FIG. 4 is a data flow diagram illustrating application of the selective frame transcoding method 301, in accordance with some embodiments.

Referring first to FIG. 3, method 301 begins with accessing or receiving an encoded video frame streamed from a stored content file at operation 304, for example in response to user activity at either a source or sink device. In exemplary embodiments, the encoded video frames have a long GOP format with the GOP length exceeding that specified in an I-frame insertion policy. At operation 306, a source decode is performed to generate reconstructed frames. These decoded frames need not be rendered at the source device, and advantageously are not rendered at the source device. Decoding operation 306 may be performed using any known technique. FIG. 4 illustrates a consecutive sequence of encoded video frames 407 including encoded P-frames P08, P09, P10, P11, P12, P13, which for example are all forward inter-predicted frames of a GOP that may be streamed out of a file stored on source device 205. Although P-frames are illustrated in FIG. 4 for the sake of clarity of discussion, it is noted other inter-predicted frame types (e.g., Bi-directional predicted frames) may be similarly processed.

As shown in FIG. 4, P-frames P09-P13 are consecutively processed through decoding operation 306 to generate locally reconstructed frame sequence 414. As illustrated by dashed lines, reconstructed frame F09 is generated from encoded picture P09 based on a previously reconstructed reference frame F08. Reconstructed frame F09 is then referenced to decode picture P10, also a P-frame. Decoding continues through the GOP, for example further decoding P-frames P11-P13 into reconstructed frames F11-F13. Depending on the GOP encoding structure and which frame(s) is selected for conversion, decoding may be performed on fewer than all frames within an originally encoded GOP. For example, for a GOP that includes all P-frames, each referencing only the prior frame, decoding operation 306 may be performed from an I-frame to the last P-frame that is to be selectively converted.

Returning to FIG. 3, at operation 308 supplemental intra-predicted frames are generated for one or more selected inter-predicted frames. Each intra-predicted frame generated at operation 308 is to replace a selected inter-predicted frame in an originally encoded GOP (i.e., an inter-predicted frame in a subset of one or more frames that are selected to be transcoded to intra-predicted frames to divide the long GOP) The long GOP is thereby shortened to satisfy some GOP length threshold and/or policy. As such, a subset (e.g., one or more) of the inter-predicted frames in a GOP is converted to intra-predicted frames as part of a frame-selective transcoding that modifies only a portion of the originally encoded GOP.

Selection of the inter-predicted frames may be accordingly to any criteria, and may for example be determined based on the GOP length of the input file and the maximum GOP length allowed by an I-frame insertion policy. Any single GOP of a given GOP length may be apportioned into any number GOP of reduced GOP length. For GOP lengths between 1 and 2× a maximum GOP length threshold, a single inter-prediction frame may be selected to bi-sect the GOP length of the input file. For example, an input GOP length of 100 pictures may be reduced to an output GOP length of 50 pictures. For GOP lengths between 2× and 3× a maximum GOP length threshold two inter-prediction frames may be selected to tri-sect the GOP length of the input file. For example, an input GOP length of 30 pictures may be reduced to an output GOP length of 10 pictures.

As further illustrated in FIG. 4, for a selected inter-predicted frame P10, I-frame encoder 408 includes logic to read in the corresponding reconstructed frame F10 and encode the reconstructed frame as a supplemental intra-predicted frame, I10*. I-frame encoder 408 may comprise any known encoder employing any known intra-prediction encoding algorithm.

Referring back to FIG. 3, encoded frames are inserted in place of the inter-predicted frame from which they were generated to modify the original encoded picture sequence. A 1:1 frame correspondence is therefore maintained at operations 308 and 310. As further illustrated in FIG. 4, supplemental intra-predicted frame I10* is inserted immediately following originally encoded inter-predicted frame P09, in place of selected inter-predicted frame P10, to form modified encoded video stream 416.

In some embodiments, in addition to converting one or more inter-predicted frame to a supplemental intra-predicted frame to reduce a GOP length, one or more residual artifact suppressed (RAS) inter-predicted frames are also generated and placed in the modified stream in the same position within the original GOP as an original frame that referenced an inter-predicted frame which is converted to a supplemental intra-predicted frame. A RAS frame is to limit propagation of artifacts resulting from I-frame insertion. The RAS frame is to use the inter-predicted frame replaced by the inserted I-frame as a reference. The RAS frame is also to use a reconstruction of the inserted I-frame as a reference. In some embodiments illustrated by FIG. 3, RAS inter-predicted frames are created at operation 314 based on reconstructions of a supplemental I-frame decoded at operation 312. At operation 316, the RAS inter-predicted frame is inserted in place of any originally encoded frames that reference a frame that is converted to a supplemental I-frame. As such, one or more $P_{RAS}$ may be generated and inserted anywhere within the original GOP as part of the selective transcoding process.

As further illustrated in FIG. 4, a reconstructed frame F11 is generated at source device 205 by decoding of P-frame P11 using reconstructed image frame F10 as a reference. Supplemental I-frame I10* is passed through a local decoder 412 to generate a reconstructed image frame F10*. Reconstructed image frame F10* is a decoded representation of a transcoded frame F10. Reconstructed image frame F10* may therefore have error stemming from the original P-frame encoding/decoding and the supplemental I-frame encoding/decoding. Residuals between the reconstructed image frame F10* and reconstructed image frame F11 are determined by comparator logic 413. The resulting residuals are provided to supplemental P-frame encoder 414, which implements any known P-frame algorithm to encode into P-frame $P_{RAS}$ the difference between the reconstructed image frame F10* and the reconstructed image frame F11 that references the decoded inter-predicted frame F10 from which the supplemental I-frame I10* was created. Also shown in FIG. 4, the P-frame $P_{RAS}$ is inserted into modified video stream 416 immediately following supplemental I-frame I10*. The insertion point for P-frame $P_{RAS}$ may vary however, replacing any originally encoded frames that reference inter-predicted frame F10. The converted frames I10* and $P_{RAS}$ therefore replace corresponding frames in the original encoded stream to modify encoded video stream 407. As such, one or more $P_{RAS}$ may be generated and inserted anywhere within the original GOP of video stream 407. Modified video stream 416 is then ready for transmission from source device 205 to a sink device.

Returning to FIG. 3, the selectively transcoded video stream is then transmitted at operation 318, for example as a stream of GOP packets transmitted through a wireless protocol, to sink device 150. In the exemplary embodiment, the modified video stream is received at operation 320, decoded at operation 322, and then rendered and displayed at operation 324. Sink device 150 may perform any known processing at operations 320, 322, and 324 because the selective transcoding does not impact operation of sink device 150. As further shown in FIG. 4, sink device 150 performs a decoding 422 to generate video stream 468 including reconstructed frames F08, F09, F10*, F11, F12, and F13. Any known rendering and display technique may then be employed to present reconstructed frames F08-F13 to a sink device viewer.

Figure 5A:
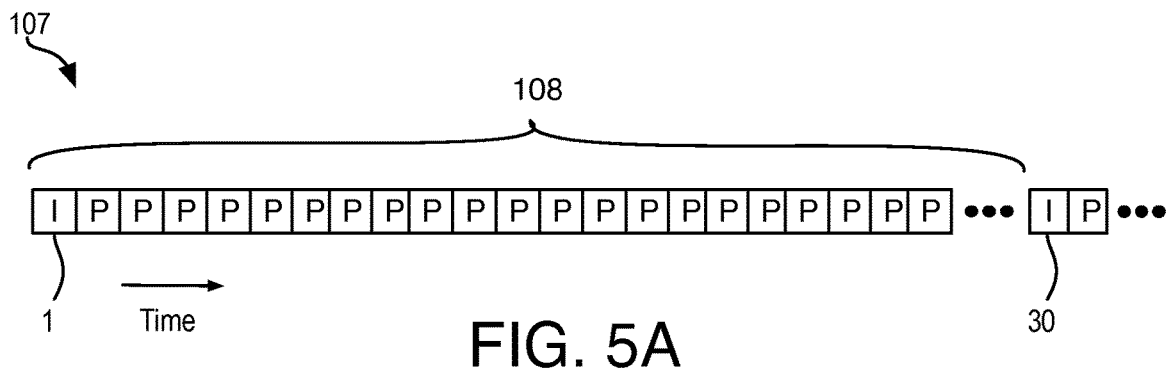
FIG. 5A illustrates an encoded video stream with I-frames and P-frames.
Figure 5B:
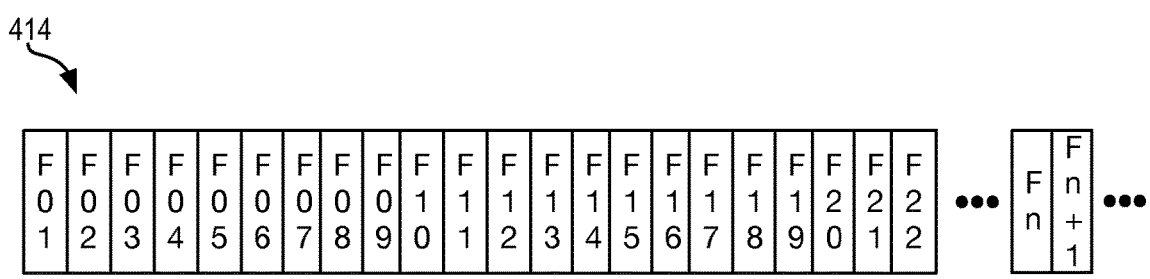
FIG. 5B illustrates an uncompressed video stream including a series of image frames, in accordance with some embodiments.
Figure 5C:
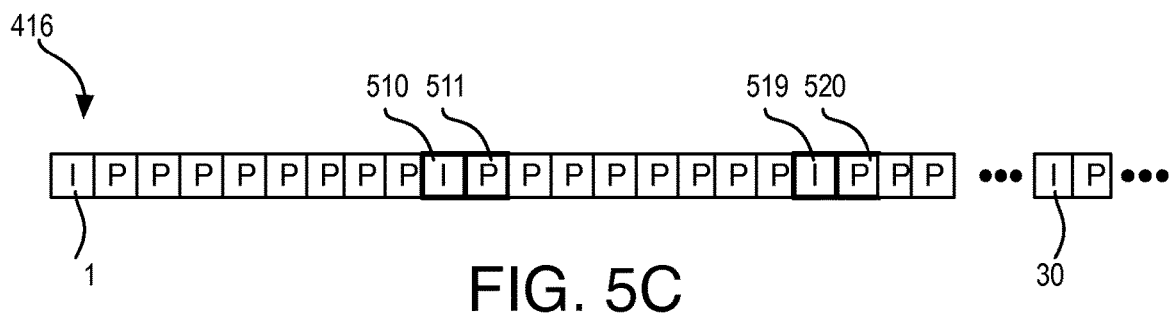
FIG. 5C illustrates an encoded video stream with converted I-frames and P-frames, in accordance with some embodiments.
Figure 5D:
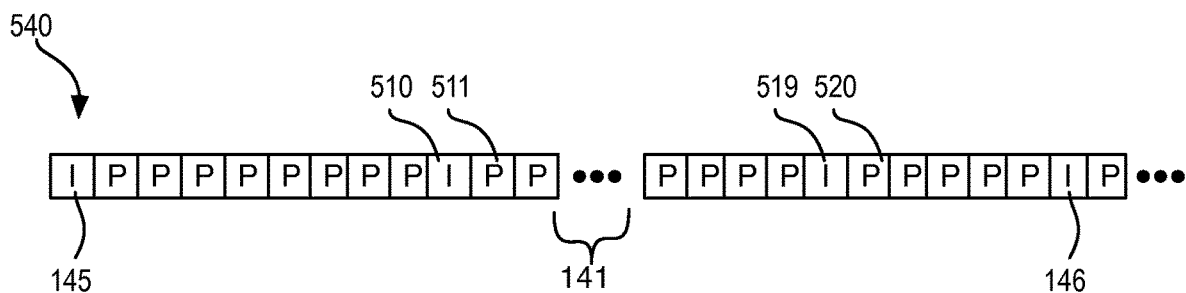
FIG. 5D depicts the encoded video stream illustrated in FIG. 5C after transmission, in accordance with some embodiments.
Figure 5E:
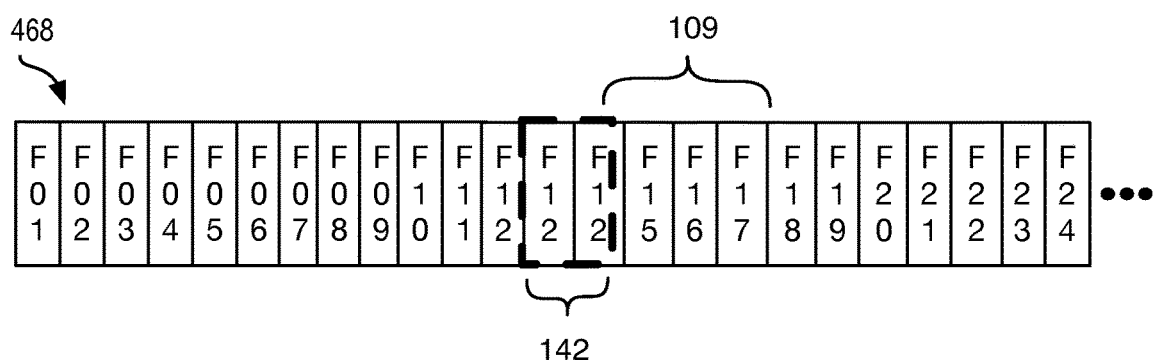
FIG. 5E depicts an uncompressed video stream decoded from the encoded video stream illustrated in FIG. 5D, in accordance with some embodiments.

FIG. 5A illustrates an encoded content stream 107 containing original I-frames 1 and 30. Each I-frame (e.g., 1) is associated with a plurality of (forward) inter-prediction P-frames making a long GOP 108, in accordance with some embodiment. FIG. 5B illustrates an uncompressed video stream 414 including a series of image frames reconstructed from encoded content stream 107 generated during a source decode operation. FIG. 5C illustrates selectively encoded video stream 416 with supplemental I-frames 510, 519 and converted P-frames 511, 520, in accordance with some embodiments. All other frames are those of encoded content stream 107. FIG. 5D depicts the selectively transcoded video stream 540 after transmission, as received at a sink device, in accordance with some embodiments. As shown, selectively transcoded video stream 540 has suffered some data loss impacting pictures 141. However, as illustrated in FIG. 5E, incorrectly decoded video frame set 109 includes only few image data frames (F15-F17) with a faster recovery occurring at image frame F18, which is reconstructed from supplemental I-frame 519. With faster recovery, visual artifacts are less likely to be apparent to a viewer as the content stream is rendered and presented on a display at the sink.

Figure 6:
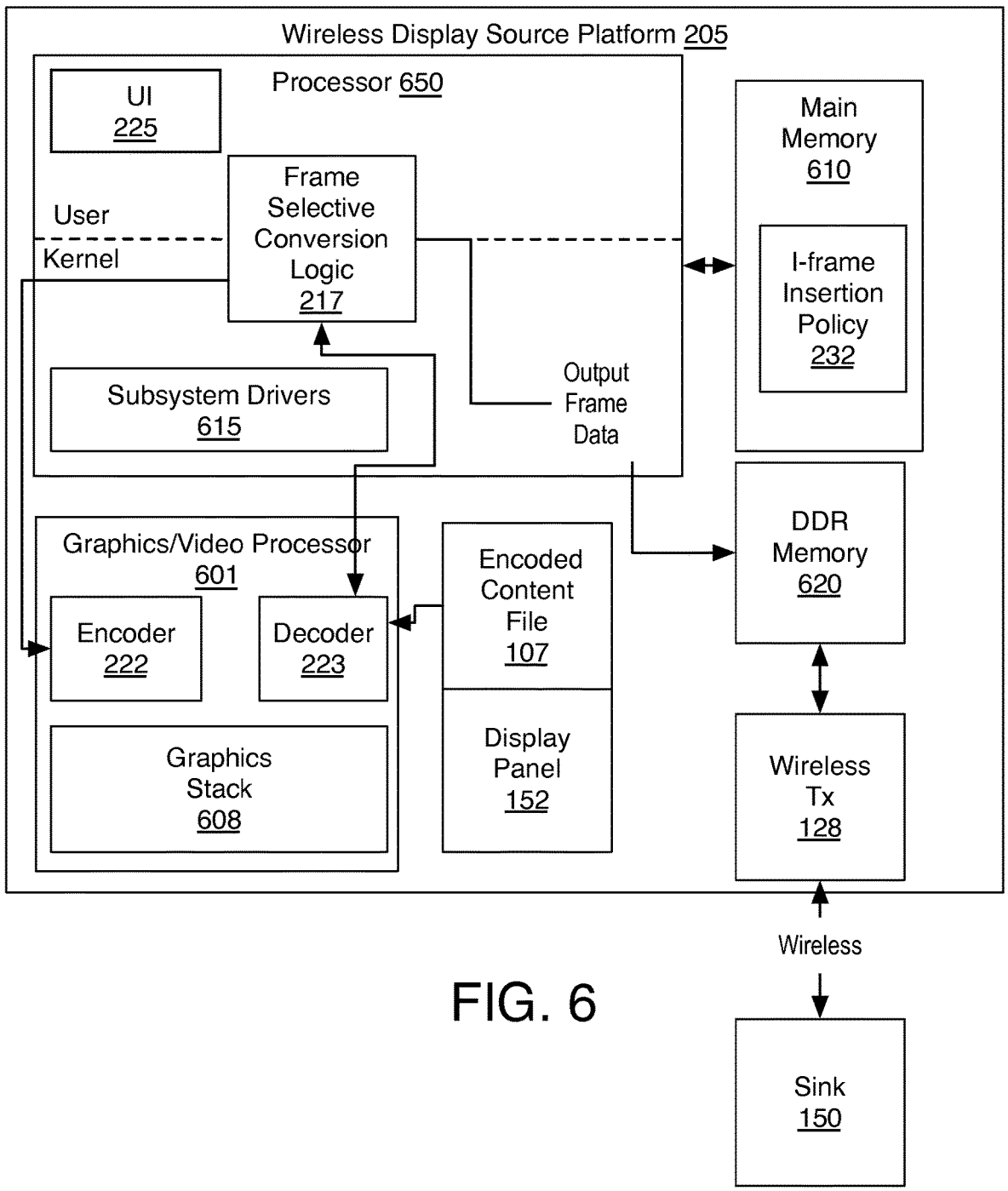
FIG. 6 is a functional block diagram of a source device operable in a direct pass-through mode, in accordance with some embodiments.

FIG. 6 is a functional block diagram illustrating a wireless display source platform 205, in accordance with embodiments. In FIG. 6, arrows highlight specific data coupling between platform blocks, for example over one or more data bus, however all platform blocks illustrated in FIG. 6 are communicatively coupled to each other unless specified otherwise. Source platform 205 includes a graphics/video processor 601. In the exemplary embodiment, graphics/video processor 601 implements graphics (video) frame encoder 222, decoder 223 and graphics stack 108. Platform 205 further includes a central/applications processor 650, which may include one or more logic processor cores. In some advantageous SOC embodiments, processor 605 and graphics/video processor 601 are integrated onto a single chip. In some heterogeneous embodiments, processor 650 interfaces with graphics/video processor 601 through subsystem drivers 615. Platform 205 further includes a display panel 152, for example employing any LCD or LED technology.

In the exemplary embodiment, processor 650 implements frame-selective transcoding logic 217, for example as a module of a transmission protocol stack (not depicted). Frames accessed from encoded file 107 may be processed into a compressed form by encoder 222 in response to commands issued by frame-selective transcoding logic 217. The encoding and sending of additional I-frame data may be implemented through either software or hardware, or with a combination of both software and hardware. For pure hardware implementations, frame-selective encoding logic 217 may be implemented by fixed function logic. For software implementations, any known programmable processor, such as a core of processor 650, may be utilized to implement the frame-selective encoding logic 217. Depending on the embodiment, frame-selective transcoding logic 217 is implemented in software instantiated in a user or kernel space of processor 650. Alternatively, a digital signal processor/vector processor having fixed or semi-programmable logic circuitry may implement one or more functions of frame-selective transcoding logic 217, as well as implement any other modules of the transmission protocol stack.

In some embodiments, processor 650 includes one or more (programmable) logic circuits to perform one or more stages of a method for reducing a GOP length for video data streamed over a real time wireless protocol, such as, but not limited to WFD or WiDi. In some embodiments, processor 650 is to access I-frame insertion policy 232 stored in main memory 610. In some embodiments, processor 650 is to determine frame insertion points based on the insertion policy 232 and frames locally decoded from incoming encoded file (e.g., stored encoded file 107). In some embodiments, processor 650 executes one or more encoded frame packetization algorithm a kernel space of the instantiated software stack. In some embodiments, processor 650 employs a graphics processor driver included in subsystem drivers 615 to trigger image frame decoding. In some embodiments, processor 650 is programmed with instructions stored on a computer readable media to cause the processor to perform one or more I-frame and/or RAS-frame conversion/insertion methods, for example such as any of those described elsewhere herein.

As further illustrated in FIG. 6, encoded video data frames may be output by wireless transceiver 128. In one exemplary embodiment, output encoded video data frames are written to electronic memory 620 (e.g., DDR, etc.). Memory 620 may be separate or a part of a main memory 610. Wireless transceiver 128 may be substantially as described elsewhere herein, to convey (e.g., following a real time streaming protocol) the output encoded video data frames to a receiving sink 150.

Figure 7:
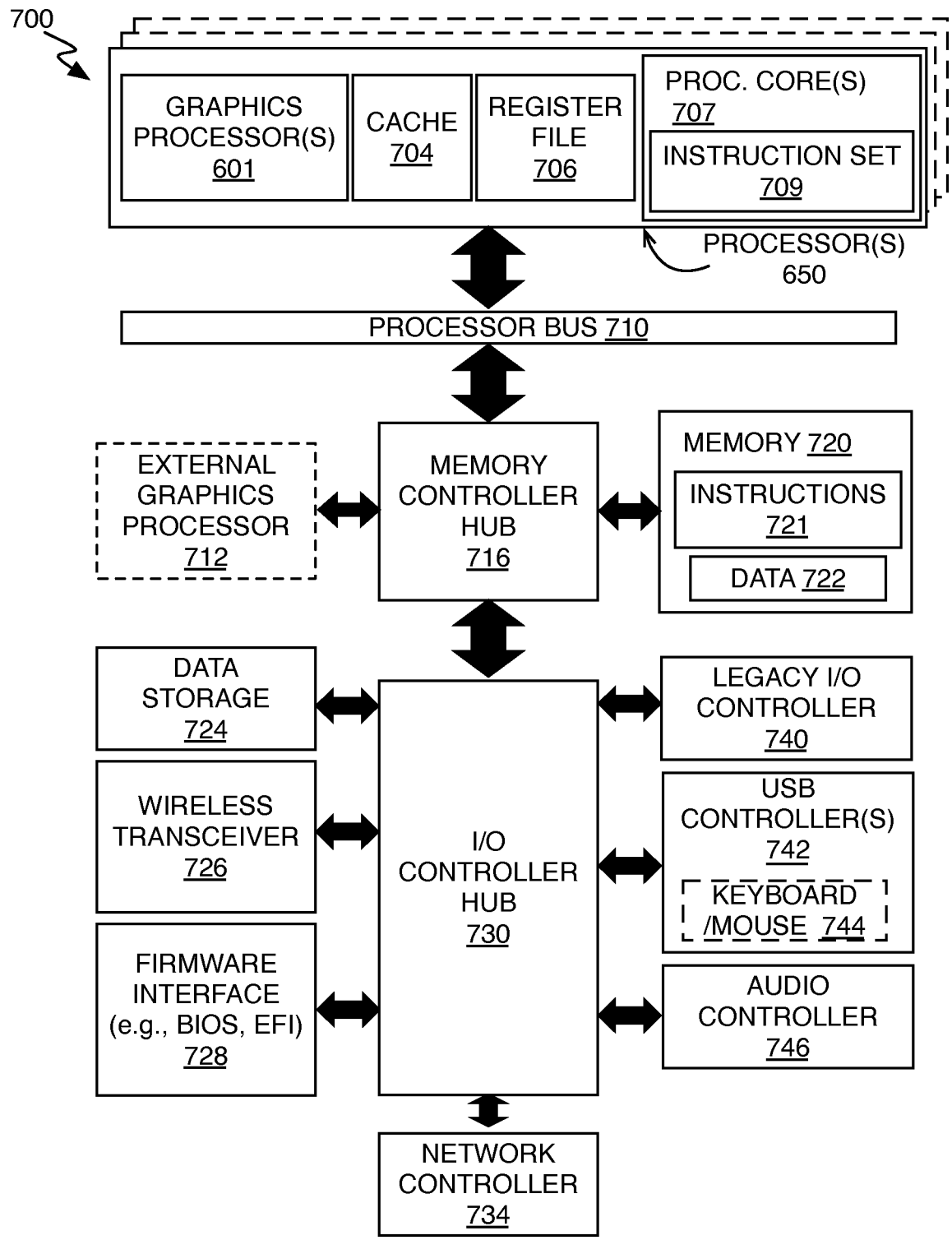
FIG. 7 is a block diagram of a data processing system, in accordance with some embodiments.

FIG. 7 block diagrams a data processing system 700 that may be utilized to selectively transcode a subset of inter-predicted frames from an encoded content file to reduce a GOP length. Data processing system 700 includes one or more processors 650 and one or more graphics processors 601, and may be implemented in a single processor desktop system, a multiprocessor workstation system, or a server system having a large number of processors 650 or processor cores 707. In another embodiment, the data processing system 700 is a system-on-a-chip (SoC) integrated circuit for use in mobile, handheld, or embedded devices.

An embodiment of data processing system 700 can include, or be incorporated within a server-based gaming platform, a game console, including a game and media console, a mobile gaming console, a handheld game console, or an online game console. In some embodiments, data processing system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, processor 702 is coupled to a processor bus 710 to transmit data signals between processor 702 and other components in system 700. System 700 has a 'hub' system architecture, including a memory controller hub 716 and an input output (I/O) controller hub 730. Memory controller hub 716 facilitates communication between a memory device and other components of system 700, while I/O Controller Hub (ICH) 730 provides connections to I/O devices via a local I/O bus.

Memory device 720 can be a dynamic random access memory (DRAM) device, a static random access memory (SRAM) device, flash memory device, or some other memory device having suitable performance to serve as process memory. Memory 720 can store data 722 and instructions 721 for use when processor 702 executes a process. Memory controller hub 716 also couples with an optional external graphics processor 712, which may communicate with the one or more graphics processors 708 in processors 702 to perform graphics and media operations.

In some embodiments, ICH 730 enables peripherals to connect to memory 720 and processor 702 via a high-speed I/O bus. The I/O peripherals include an audio controller 746, a firmware interface 728, a wireless transceiver 726 (e.g., Wi-Fi, Bluetooth), a data storage device 724 (e.g., hard disk drive, flash memory, etc.), and a legacy I/O controller for coupling legacy (e.g., Personal System 2 (PS/2)) devices to the system. One or more Universal Serial Bus (USB) controllers 742 connect input devices, such as keyboard and mouse 744 combinations. A network controller 734 may also couple to ICH 730. In some embodiments, a high-performance network controller (not shown) couples to processor bus 710.

Figure 8:
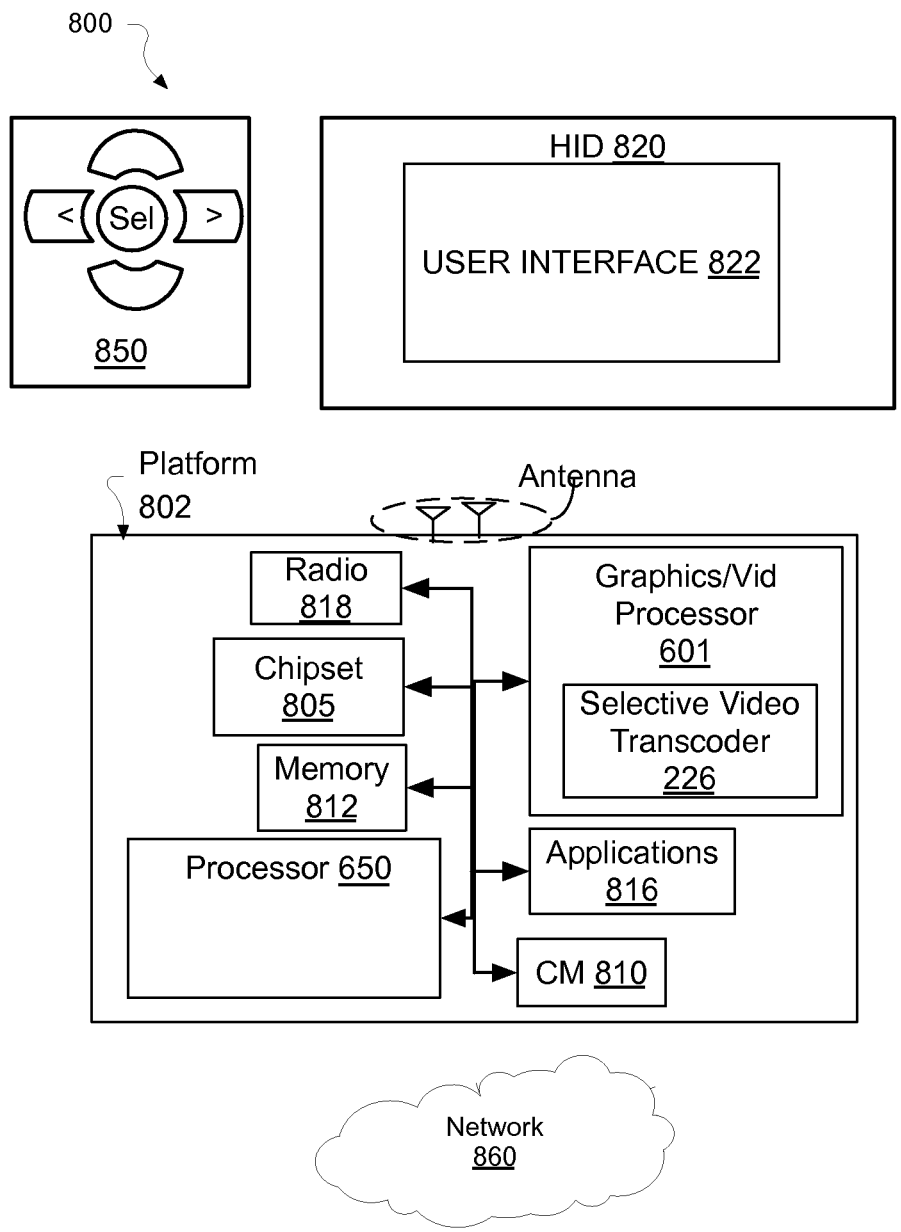
FIG. 8 is a diagram of an exemplary ultra-low power system including selective frame transcoding logic, in accordance with some embodiments.

FIG. 8 is a diagram of an exemplary ultra-low power system 800, in accordance with one or more embodiment. System 800 may be a mobile device although system 800 is not limited to this context. System 800 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and so forth. System 800 may also be an infrastructure device. For example, system 800 may be incorporated into a large format television, set-top box, desktop computer, or other home or commercial network device.

System 800 includes a device platform 802 that may implement all or a subset of the frame-selective transcoding, packetization, and wireless transmission methods described above in the context of FIG. 1-6. In various exemplary embodiments, processor 650 or graphics/video processor 601 executes I-frame conversion/insertion into an encoded video stream multiplexing, for example as described elsewhere herein. In the illustrated embodiment, graphics/video processor 601 includes logic circuitry implementing frame-selective video transcoder 216, for example as described elsewhere herein. In some embodiments, one or more computer readable media may store instructions, which when executed by a CPU 650 and/or graphics/video processor 601, cause the processor(s) to execute one or more of the local decoding, supplemental I-frame and RAS frame transcoding, and selectively transcoded video stream transmissions described elsewhere herein. Such transmissions may be through radio 818.

In embodiments, device platform 802 is coupled to a human interface device (HID) 820. Platform 802 may collect raw image data with CM 110 and 211, which is processed and output to HID 820. A navigation controller 850 including one or more navigation features may be used to interact with, for example, device platform 802 and/or HID 820. In embodiments, HID 820 may include any monitor or display coupled to platform 802 via radio 818 and/or network 860. HID 820 may include, for example, a computer display screen, touch screen display, video monitor, television-like device, and/or a television.

In embodiments, device platform 802 may include any combination of camera module 810, chipset 805, processors 601, 650, memory/storage 812, applications 816, and/or radio 818. Chipset 805 may provide intercommunication among processors 601, 650, memory 812, video processor 815, applications 816, or radio 818.

One or more of processors 601, 650 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 812 may be implemented as a volatile memory device such as, but not limited to, a Random Access Memory (RAM), Dynamic Random Access Memory (DRAM), or Static RAM (SRAM). Memory 812 may also be implemented as a non-volatile storage device such as, but not limited to flash memory, battery backed-up SDRAM (synchronous DRAM), magnetic memory, phase change memory, and the like.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (MC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Figure 9:
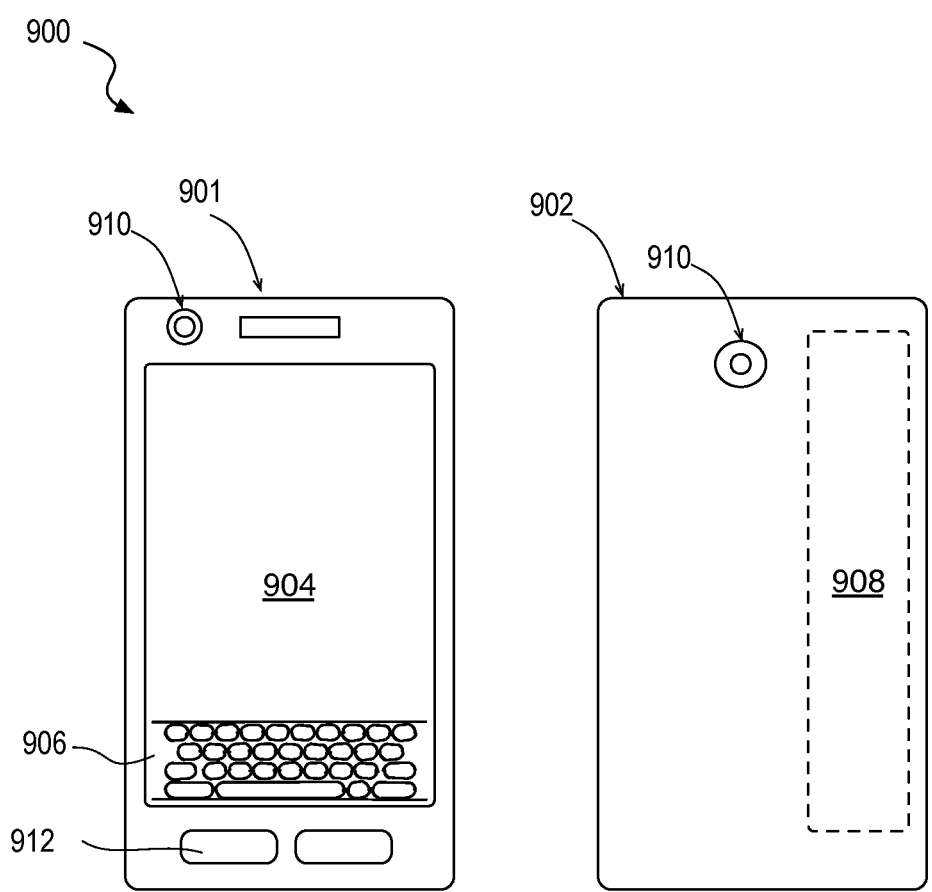
FIG. 9 is a diagram of an exemplary mobile handset platform, arranged in accordance with some embodiments.

As described above, system 800 may be embodied in varying physical styles or form factors. FIG. 9 further illustrates embodiments of a mobile handset device 900 in which platform 802 and/or system 800 may be embodied. In embodiments, for example, device 900 may be implemented as a mobile computing handset device having wireless capabilities. As shown in FIG. 9, mobile handset device 900 may include a housing with a front 901 and back 902. Device 900 includes a display 904, an input/output (I/O) device 906, and an integrated antenna 908. Device 900 also may include user interface features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone (not shown), or may be digitized by a voice recognition device. Embodiments are not limited in this context. Integrated into at least one of the camera front 901 or back 902 is a camera module 910 (e.g., including one or more lens, aperture, and imaging sensor).

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

Systems for wireless display direct pass-through with selective frame transcoding to reduce GOP length comporting with exemplary embodiments described herein may be implemented in various hardware architectures, cell designs, or "IP cores."

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood as physically transformed into a system falling within the scope of at least some embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments:

In one or more first embodiments, an image frame display source apparatus comprises an audio/video (AV) pipeline to access an encoded video stream from a storage device, the encoded video stream comprising a group of pictures (GOP) including a plurality of inter-predicted frames referencing a first intra-predicted frame. The apparatus further comprises one or more processors to modify the encoded video stream with a selective transcoding of only a subset of the inter-predicted frames in the GOP, the selective transcoding including a transcoding of a first subset of the inter-predicted frames into second intra-predicted frames. The apparatus further comprises a physical layer device to communicate the modified encoded video stream through a transmission protocol.

In furtherance of the first embodiments, to transcode a first inter-predicted frame in the first subset, the processors are further to decode the GOP, and encode a reconstructed first image frame decoded from the first inter-predicted frame into one of the second intra-predicted frames.

In furtherance of the first embodiments, the processors are further to select a second subset of the inter-predicted frames, each frame in the second subset referencing one or more of the inter-predicted frames included in the first subset, transcode the second subset of inter-predicted frames into second inter-predicted frames, and modify the encoded video stream by inserting the second inter-predicted frames in place of the second subset of inter-predicted frames, each second inter-predicted frame replacing a corresponding frame in the second subset.

In furtherance of the first embodiment immediately above, a second inter-predicted frame included in the second subset references the first inter-predicted frame included in the first subset, and the processors are to transcode the second inter-predicted frame into a modified inter-predicted frame based on residuals between the second intra-predicted frame and the first inter-predicted frame.

In furtherance of the first embodiment immediately above, to transcode the second inter-predicted frame, the processors are further to decode the second intra-predicted frame into a reconstructed first image, decode the second inter-predicted frame into a reconstructed second image, generate residuals between the reconstructed first and second images, and encode the residuals into the modified second inter-predicted frame.

In furtherance of the first embodiments, to transcode the first subset of the inter-predicted frames, the processors are to select a plurality of first inter-predicted frames based on a length of the GOP and a predetermined GOP length threshold, and transcode each of the plurality of first inter-predicted frames into a plurality of second intra-predicted frames. To modify the encoded video stream, the processors are to divide the GOP into a plurality of smaller picture groups having lengths less than the threshold by inserting each of the second intra-predicted frames into the encoded video stream in place of a corresponding one of the first inter-predicted frames.

In furtherance of the first embodiment immediately above, the processors are further to transcode each frame in a second subset of the inter-predicted frames, each frame in the second subset referencing at least one of the first inter-predicted frames into a modified inter-predicted frame based on residuals between one of the second intra-predicted frames and a corresponding one of the second inter-predicted frames.

In furtherance of the first embodiments, the physical layer device further comprises a wireless radio to wirelessly transmit the modified encoded video stream to a sink device.

In one or more second embodiment, a wireless display system comprises the source apparatus of the first embodiments, and a sink apparatus to decode the modified video stream into reconstructed image frames, render the reconstructed image frames, and present the rendered frames on a display screen.

In one or more third embodiments, a method for direct pass-through of an encoded video stream, the method comprising accessing the encoded video stream from a storage device, the encoded video stream comprising a group of pictures (GOP) including a plurality of inter-predicted frames referencing a first intra-predicted frame. The method further comprising modifying the encoded video stream by selectively transcoding only a subset of the inter-predicted frames in the GOP, the selective transcoding including transcoding a first subset of the inter-predicted frames into second intra-predicted frames. The method further comprising transmitting the modified encoded video stream over a physical layer device.

In furtherance of the third embodiments, transcoding a first inter-predicted frame in the first subset further comprises decoding the GOP, and encoding a reconstructed first image frame decoded from the first inter-predicted frame into one of the second intra-predicted frames.

In furtherance of the third embodiments, transcoding the first inter-predicted frame further comprises selecting one of the inter-predicted frames in the GOP, the selected inter-predicted frame immediately following a second of the inter-predicted frames in the GOP, transcoding the selected inter-predicted frame into the second intra-predicted frame, and modifying the encoded video stream by inserting the second intra-predicted frame immediately following the second of the inter-predicted frames, in place of the selected inter-predicted frame.

In furtherance of the third embodiments, the method further comprises selecting a second subset of the inter-predicted frames, each frame in the second subset referencing one or more of the inter-predicted frames included in the first subset, transcoding the second subset of inter-predicted frames into second inter-predicted frames, and modifying the encoded video stream by inserting the second inter-predicted frames in place of the second subset of inter-predicted frames, each second inter-predicted frame replacing a corresponding frame within the second subset.

In furtherance of the third embodiment immediately above, transcoding the second inter-predicted frame further comprises decoding the second intra-predicted frame into a reconstructed first image, decoding the second inter-predicted frame into a reconstructed second image, generating residuals between the reconstructed first and second images, and encoding the residuals into the second inter-predicted frame.

In furtherance of the third embodiments, selectively transcoding further comprises selecting a plurality of first inter-predicted frames based on a length of the GOP and a predetermined GOP length threshold, and transcoding each of the plurality of first inter-predicted frames into a plurality of second intra-predicted frames. Modifying the encoded video stream further comprises dividing the GOP into a plurality of smaller picture groups having lengths less than the threshold by inserting each of the second intra-predicted frames into the encoded video stream in place of a corresponding one of the first inter-predicted frames.

In furtherance of the third embodiment immediately above, the method further comprises transcoding each frame in a second subset of the inter-predicted frames, each frame referencing at least one of the first inter-predicted frames into a modified inter-predicted frame based on residuals between one of the second intra-predicted frames and a corresponding one of the second inter-predicted frames.

In furtherance of the third embodiments, transmitting the modified encoded video stream further comprises wirelessly transmitting the modified encoded video stream to a sink device.

In one or more fourth embodiment, one or more computer readable media includes instruction stored thereon, which when executed by a processing system, cause the system to perform a method comprising accessing the encoded video stream from a storage device, the encoded video stream comprising a group of pictures (GOP) including a plurality of inter-predicted frames referencing a first intra-predicted frame, modifying the encoded video stream by selectively transcoding only a subset of the inter-predicted frames in the GOP, the selective transcoding including transcoding a first subset of the inter-predicted frames into second intra-predicted frames, and transmitting the modified encoded video stream over a physical layer device.

In furtherance of the fourth embodiments, the instructions further cause the system to perform a method comprising selecting a second subset of the inter-predicted frames, each frame in the second subset referencing one or more of the inter-predicted frames included in the first subset, transcoding the second subset of inter-predicted frames into second inter-predicted frames, and modifying the encoded video stream by inserting the second inter-predicted frames in place of the second subset of inter-predicted frames, each second inter-predicted frame replacing a corresponding frame within the second subset.

In furtherance of the fourth embodiments, the instructions further cause the system to perform a method further comprising decoding the GOP, and encoding a reconstructed first image frame decoded from the first inter-predicted frame into one of the second intra-predicted frames.

In one or more fifth embodiment, a computer readable media includes instruction stored thereon, which when executed by a processing system, cause the system to perform any one of the third embodiments.

In one or more sixth embodiment, an image frame display source apparatus comprises one or more means to perform any one of the third embodiments.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:
1. An image frame display source apparatus, comprising:
an audio/video (AV) pipeline to access an encoded video stream from a storage device, the encoded video stream comprising a group of pictures (GOP) including a plurality of inter-predicted frames and a first intra-predicted frame;

one or more processors to modify the encoded video stream with a selective transcoding of only a subset of the inter-predicted frames in the GOP, the selective transcoding including a transcoding of a first subset of the inter-predicted frames into second intra-predicted frames that are inserted among others of the inter-predicted frames encoded according to the GOP; and a physical layer device to communicate the modified encoded video stream through a transmission protocol.

2. The apparatus of claim 1, wherein to transcode a first inter-predicted frame in the first subset, the processors are further to:

decode the GOP; and encode a reconstructed first image frame decoded from the first inter-predicted frame into one of the second intra-predicted frames.

3. The apparatus of claim 1, wherein the processors are further to:

select a second subset of the inter-predicted frames, each frame in the second subset referencing one or more of the inter-predicted frames included in the first subset;

transcode the second subset of inter-predicted frames into second inter-predicted frames; and modify the encoded video stream by inserting the second inter-predicted frames in place of the second subset of inter-predicted frames, each second inter-predicted frame replacing a corresponding frame in the second subset.

4. The apparatus of claim 3, wherein a second inter-predicted frame included in the second subset references the first inter-predicted frame included in the first subset; and the processors are to transcode the second inter-predicted frame into a modified inter-predicted frame based on residuals between the second intra-predicted frame and the second inter-predicted frame.

5. The apparatus of claim 4, wherein to transcode the second inter-predicted frame, the processors are further to:

decode the second intra-predicted frame into a reconstructed first image;

decode the second inter-predicted frame into a reconstructed second image;

generate residuals between the reconstructed first and second images; and encode the residuals into the modified second inter-predicted frame.

6. The apparatus of claim 1, wherein:

to transcode the first subset of the inter-predicted frames, the processors are to:

select a plurality of first inter-predicted frames based on a length of the GOP and a predetermined GOP length threshold; and transcode each of the plurality of first inter-predicted frames into a plurality of second intra-predicted frames; and to modify the encoded video stream, the processors are to divide the GOP into a plurality of smaller picture groups having lengths less than the threshold by inserting each of the second intra-predicted frames into the encoded video stream in place of a corresponding one of the first inter-predicted frames.

7. The apparatus of claim 6, wherein the processors are further to transcode each frame in a second subset of the inter-predicted frames, each frame in the second subset referencing at least one of the first inter-predicted frames into a modified inter-predicted frame based on residuals between one of the second intra-predicted frames and a corresponding one of the second inter-predicted frames.

8. The apparatus of claim 1, wherein the physical layer device further comprises a wireless radio to wirelessly transmit the modified encoded video stream to a sink device.

9. A wireless display system, comprising:

the source apparatus of claim 1; and a sink apparatus to:

decode the modified video stream into reconstructed image frames;

render the reconstructed image frames; and present the rendered frames on a display screen.

10. A method for direct pass-through of an encoded video stream, the method comprising:

accessing the encoded video stream from a storage device, the encoded video stream comprising a group of pictures (GOP) including a plurality of inter-predicted frames and a first intra-predicted frame;

modifying the encoded video stream by selectively transcoding only a subset of the inter-predicted frames in the GOP, the selective transcoding including transcoding a first subset of the inter-predicted frames into second intra-predicted frames that are inserted among a remainder of the inter-predicted frames encoded according to the GOP; and transmitting the modified encoded video stream over a physical layer device.

11. The method of claim 10, wherein transcoding a first inter-predicted frame in the first subset further comprises:

decoding the GOP; and encoding a reconstructed first image frame decoded from the first inter-predicted frame into one of the second intra-predicted frames.

12. The method of claim 10, wherein transcoding the first inter-predicted frame further comprises:

selecting one of the inter-predicted frames in the GOP, the selected inter-predicted frame immediately following a second of the inter-predicted frames in the GOP;

transcoding the selected inter-predicted frame into the second intra-predicted frame; and modifying the encoded video stream by inserting the second intra-predicted frame immediately following the second of the inter-predicted frames, in place of the selected inter-predicted frame.

13. The method of claim 10, further comprising:

selecting a second subset of the inter-predicted frames, each frame in the second subset referencing one or more of the inter-predicted frames included in the first subset;

transcoding the second subset of inter-predicted frames into second inter-predicted frames; and modifying the encoded video stream by inserting the second inter-predicted frames in place of the second subset of inter-predicted frames, each second inter-predicted frame replacing a corresponding frame within the second subset.

14. The method of claim 13, wherein transcoding the second inter-predicted frame further comprises:

decoding the second intra-predicted frame into a reconstructed first image;

decoding the second inter-predicted frame into a reconstructed second image;

generating residuals between the reconstructed first and second images; and encoding the residuals into the second inter-predicted frame.

15. The method of claim 10, wherein:
selectively transcoding further comprises:
- selecting a plurality of first inter-predicted frames based on a length of the GOP and a predetermined GOP length threshold; and
- transcoding each of the plurality of first inter-predicted frames into a plurality of second intra-predicted frames; and modifying the encoded video stream further comprises dividing the GOP into a plurality of smaller picture groups having lengths less than the threshold by inserting each of the second intra-predicted frames into the encoded video stream in place of a corresponding one of the first inter-predicted frames.

16. The method of claim 15, further comprising:
transcoding each frame in a second subset of the inter-predicted frames, each frame referencing at least one of the first inter-predicted frames into a modified inter-predicted frame based on residuals between one of the second intra-predicted frames and a corresponding one of the second inter-predicted frames.

17. The method of claim 10, wherein transmitting the modified encoded video stream further comprises wirelessly transmitting the modified encoded video stream to a sink device.

18. One or more non-transitory computer readable media including instruction stored thereon, which when executed by a processing system, cause the system to perform a method comprising:
- accessing the encoded video stream from a storage device, the encoded video stream comprising a group of pictures (GOP) including a plurality of inter-predicted frames and a first intra-predicted frame;
- modifying the encoded video stream by selectively transcoding only a subset of the inter-predicted frames in the GOP, the selective transcoding including transcoding a first subset of the inter-predicted frames into second intra-predicted frames that are inserted among a remainder of the inter-predicted frames encoded according to the GOP; and
- transmitting the modified encoded video stream over a physical layer device.

19. The media of claim 18, wherein the instructions further cause the system to perform a method comprising:
- selecting a second subset of the inter-predicted frames, each frame in the second subset referencing one or more of the inter-predicted frames included in the first subset;
- transcoding the second subset of inter-predicted frames into second inter-predicted frames; and
- modifying the encoded video stream by inserting the second inter-predicted frames in place of the second subset of inter-predicted frames, each second inter-predicted frame replacing a corresponding frame within the second subset.

20. The media of claim 18, further comprising instructions that further cause the system to perform a method further comprising:
- decoding the GOP; and
- encoding a reconstructed first image frame decoded from the first inter-predicted frame into one of the second intra-predicted frames.

* * * * *